United States Patent
Guo et al.

(10) Patent No.: US 11,099,916 B2
(45) Date of Patent: Aug. 24, 2021

(54) METHOD AND DEVICE FOR PRESENTING INFORMATION ON TERMINAL

(71) Applicant: Beijing Xiaomi Mobile Software Co., Ltd., Beijing (CN)

(72) Inventors: Tao Guo, Beijing (CN); Yi Zhong, Beijing (CN); Ying Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/724,439

(22) Filed: Dec. 23, 2019

(65) Prior Publication Data
US 2021/0026712 A1    Jan. 28, 2021

(30) Foreign Application Priority Data
Jul. 24, 2019    (CN) .......................... 201910672765.2

(51) Int. Cl.
| | | |
|---|---|---|
| G06F 9/54 | (2006.01) | |
| G06F 16/955 | (2019.01) | |
| H04M 1/72469 | (2021.01) | |
| H04M 1/72454 | (2021.01) | |
| G06F 3/0481 | (2013.01) | |
| G06F 3/0484 | (2013.01) | |

(52) U.S. Cl.
CPC .......... *G06F 9/543* (2013.01); *G06F 3/04817* (2013.01); *G06F 16/9566* (2019.01); *H04M 1/72454* (2021.01); *H04M 1/72469* (2021.01); *G06F 3/04842* (2013.01)

(58) Field of Classification Search
CPC .............................. G06F 3/04842; G06F 9/543

USPC .......................................................... 715/770
See application file for complete search history.

(56) References Cited

U.S. PATENT DOCUMENTS

| | | | |
|---|---|---|---|
| 6,820,198 B1 * | 11/2004 | Ross ...................... | G06F 21/602 713/165 |
| 7,301,658 B2 * | 11/2007 | Henry ..................... | H04L 29/06 358/1.15 |
| 7,373,603 B1 * | 5/2008 | Yalovsky ................ | G06F 9/543 709/203 |

(Continued)

FOREIGN PATENT DOCUMENTS

| | | |
|---|---|---|
| CN | 102043666 A | 5/2011 |
| CN | 103516904 A | 1/2014 |

(Continued)

OTHER PUBLICATIONS gsmarea.com, "Chrome 60 for Android adds fast home screen search widget", available at <<https://www.gsmarena.com/chrome_60_for_android_adds_fast_home_screen_search_widget-news-26519.php>>, archived on Aug. 2, 2017 at wayback machine: https://web.archive.org (Year: 2017).*

(Continued)

*Primary Examiner* — Daniel Rodriguez
(74) *Attorney, Agent, or Firm* — Finnegan, Henderson, Farabow, Garrett & Dunner, L.L.P.

(57) ABSTRACT

A method of presenting information on a terminal, includes: acquiring first information in a clipboard when an operation interface of the terminal switches to a specified interface; and generating and presenting second information based on content of the first information when the first information has not been presented before and meets a presentation condition.

17 Claims, 7 Drawing Sheets

(56) References Cited

U.S. PATENT DOCUMENTS

| | | | |
|---|---|---|---|
| 7,417,650 B1* | 8/2008 | Horvitz | G06F 9/451 715/765 |
| 8,423,408 B1* | 4/2013 | Barnes | G06Q 30/02 705/14.49 |
| 9,406,103 B1* | 8/2016 | Gray | G06F 3/0482 |
| 2005/0028078 A1* | 2/2005 | Tann | G06F 21/10 715/201 |
| 2006/0282401 A1* | 12/2006 | Waggoner | G06F 16/903 |
| 2007/0063039 A1 | 3/2007 | Silverbrook et al. | |
| 2008/0036757 A1* | 2/2008 | Furukawa | G11B 27/105 345/418 |
| 2009/0163183 A1* | 6/2009 | O'Donoghue | G06Q 30/02 455/414.1 |
| 2012/0166956 A1* | 6/2012 | Hilerio | G06F 9/44505 715/734 |
| 2012/0191756 A1 | 7/2012 | Son | |
| 2012/0272176 A1 | 10/2012 | Nielsen et al. | |
| 2013/0067359 A1* | 3/2013 | Lalmalani | G06F 8/61 715/760 |
| 2013/0205187 A1* | 8/2013 | Hawkins | G06F 40/10 715/208 |
| 2013/0262972 A1 | 10/2013 | Ozzie et al. | |
| 2014/0156623 A1* | 6/2014 | Guha | G06F 16/358 707/706 |
| 2014/0195953 A1* | 7/2014 | Sakai | G06F 3/0485 715/771 |
| 2014/0250390 A1* | 9/2014 | Holmes | G06F 3/0482 715/760 |
| 2014/0379813 A1* | 12/2014 | Charania | H04L 51/24 709/206 |
| 2015/0153921 A1* | 6/2015 | Dou | G06F 9/453 715/760 |
| 2015/0317143 A1* | 11/2015 | Huang | G06F 3/04817 717/177 |
| 2016/0360382 A1* | 12/2016 | Gross | G06F 3/016 |
| 2017/0192644 A1 | 7/2017 | Francis et al. | |
| 2017/0318072 A1 | 11/2017 | Borrowman et al. | |
| 2017/0323020 A1* | 11/2017 | Bosarge | G06F 16/9535 |
| 2018/0067785 A1* | 3/2018 | Crowe | G06F 9/543 |
| 2018/0188924 A1 | 7/2018 | Kumar et al. | |
| 2018/0367483 A1* | 12/2018 | Rodriguez | H04L 51/04 |
| 2019/0329125 A1* | 10/2019 | Peretz | A63F 9/18 |
| 2019/0347144 A1* | 11/2019 | Chen | G06F 9/541 |
| 2020/0169789 A1* | 5/2020 | Kim | H04N 21/4532 |

FOREIGN PATENT DOCUMENTS

| | | |
|---|---|---|
| CN | 104899269 A | 9/2015 |
| CN | 106202217 A | 12/2016 |
| CN | 106897155 A | 6/2017 |
| CN | 106970755 A | 7/2017 |
| CN | 107193976 A | 9/2017 |
| CN | 107229705 A | 10/2017 |
| CN | 107277269 A | 10/2017 |
| CN | 109241459 A | 1/2019 |
| KR | 10-2019-0055271 A | 5/2019 |
| RU | 2544751 C2 | 3/2015 |
| WO | WO 2016/042303 A1 | 3/2016 |

OTHER PUBLICATIONS

Extended European Search Report dated Jun. 8, 2020 for European Application No. EP 19216509.0 (8 pages).

International Search Reported dated Apr. 20, 2020 for PCT Application No. PCT/CN2019/110483 (4 pages).

Office Action from Federal Service for Intellectual Property of Russian Federation, for Application No. 2019143687/07(084634), dated May 15, 2020.

Notification of Reason for Refusal front the Korean Intellectual Property Office in counterpart Korean Application No. 10-2019-7035483 dated Feb. 8, 2021.

* cited by examiner

METHOD AND DEVICE FOR PRESENTING INFORMATION ON TERMINAL

CROSS-REFERENCE TO RELATED APPLICATIONS

The present application is based upon and claims priority to Chinese Patent Application No. 201910672765.2, filed on Jul. 24, 2019, the entire content of which is incorporated herein by reference.

TECHNICAL FIELD

The present disclosure generally relates to the application of terminals, and more particularly, to a method and a device for presenting information on a terminal.

BACKGROUND

In relevant technology, when a user of a terminal obtains a uniform resource locator (URL) address or a password through social software, the user has to copy the URL or the password at first, and then return to the desktop to search for and open a corresponding browser or APP, such as Taobao (an online shopping APP), so as to further browse a web page or a product page, which is cumbersome in operation.

SUMMARY

According to a first aspect of embodiments of the present disclosure, there is provided a method of presenting information on a terminal, including: acquiring first information in a clipboard when an operation interface of the terminal switches to a specified interface; and generating and presenting second information based on content of the first information when the first information has not been presented before and meets a presentation condition.

According to a second aspect of embodiments of the present disclosure, there is provided a terminal, including: a processor; and a memory for storing instructions executable by the processor; wherein the processor is configured to: acquire first information in a clipboard when an operation interface of the terminal switches to a specified interface; and generate and present second information based on content of the first information when the first information has not been presented before and meets a presentation condition.

According to a third aspect of embodiments of the present disclosure, there is provided a non-transitory computer-readable storage medium having stored therein instructions that, when executed by a processor of a terminal, cause the terminal to perform a method of presenting information, the method including: acquiring first information in a clipboard when an operation interface of the terminal switches to a specified interface; and generating and presenting second information based on content of the first information when the first information has not been presented before and meets a presentation condition.

The technical solution provided by the embodiments of the present disclosure may have the following beneficial effects: acquiring information in a clipboard when an operation interface of the terminal switches to a specified interface; and generating and presenting second information when the information has not been presented before and meets a presentation condition, thus facilitating user operation and improving user experience.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
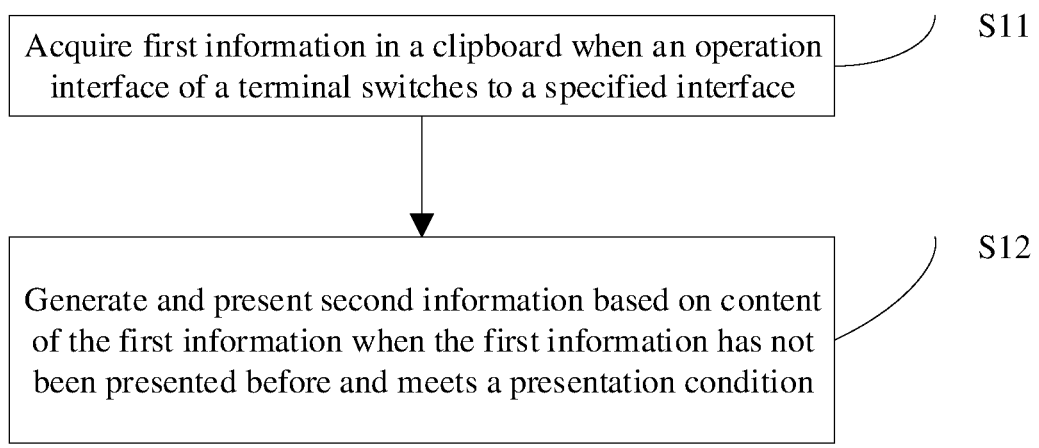
FIG. 1 is a flowchart illustrating a method of presenting information on a terminal according to an exemplary embodiment.

FIG. 1 is a flowchart illustrating a method of presenting information on a terminal according to an exemplary embodiment. As illustrated in FIG. 1, the method of presenting information may be used in a terminal, and may include the following steps.

In step S11, when an operation interface of the terminal switches to a specified interface, first information in a clipboard is obtained.

In step S12, when the first information has not been presented, and meets a presentation condition, second information is generated and presented based on content of the first information.

In the embodiment, when a user switches the operation interface to the specified interface, the system checks content in a clipboard, and determines whether the content is content that the user wants to continue viewing. If it is determined that the content is the content that the user wants to continue viewing, and that the content has not been presented before, further information will be generated and presented to the user based on the content, for convenience of further operations by the user. For example, if the user copies a password of an application (APP), such as Taobao, there is a great possibility that the user may further view content related to the password. When the user switches the operation interface to a specified interface, second information, such as "Open the Taobao Password" is generated, and presented at a specified location in the specified interface. If the user wants to further view the content, the user can directly tap the second information to access a product webpage corresponding to the Taobao password without the necessity of searching for and opening the corresponding Taobao APP.

In step S11, the specified interface may be a desktop. The first information is information copied to the clipboard, such as a paragraph of text, a URL or a Taobao password. When the user finds content that the user is interested in and copies the content, the user usually returns to the desktop, and then opens the corresponding APP and pastes the content that has just been copied. In the present disclosure, in order to simplify the user's operation, when the user returns to the desktop, the system checks whether there is any information copied by the user in the clipboard. If there is information copied by the user in the clipboard, and the information has not be presented before and meets the presentation condition, the system will generate corresponding information to be presented to the user in a state of the desktop, and the user can further operate the copied information without accessing the relevant APP.

In some embodiments, to reduce interference with the user, the system carries out the above steps when the user copies a piece of information and returns to the desktop, which means that the user may want to perform further operations on the copied information. The system may not capture and present the copied information until it is detected that the terminal returns to the desktop, so to avoid interference with the user.

In step S12, before the second information is generated and presented based on the content of the first information, the method further includes: locally analyzing whether the first information contains a link object, or sending the first information to a server, and requesting the server to analyze whether the first information contains a link object; and determining that the first information meets the presentation condition if the first information contains the link object.

The terminal analyzes whether the first information contains the link object, or the terminal sends the first information to the server and requests the server to analyze whether the first information contains the link object. In some embodiments, analyzing the first information by the server is may be faster with more accurate results and more flexible procedure setting.

It is determined that the first information meets the presentation condition if the analysis result is that the first information contains a link object. The purpose of presenting the second information is for convenience of further operation by the user. If the first information contains the link object, the user can tap the second information that is presented, and switch to the linked web page or page.

In an embodiment, the link object includes a uniform resource identifier (URI) or associated content. The URI includes a uniform resource locator (URL); and the associated content may be associated content of a password of an APP, such as a Taobao password or an Alipay password, or associated content of passwords generated by other applications.

The generating and presenting the second information based on the content of the first information may include: according to an application that opens the link object, generating and presenting the second information related to the application. For example, the first information is a URL, an application that opens the URL is a browser, and the second information is information related to the browser, which may be "open the copied URL." For another example, the first information is a Taobao password, the Taobao password includes associated content that is associated with a specified product page, and the second information may be "open the Taobao password."

In an embodiment, the second information is displayed as text information and/or an icon, wherein the icon is an icon of an application.

The second information can be displayed as text information and/or an icon, wherein text, or an icon, or a combination of text and an icon can be displayed according to concrete conditions. For example, if the second information is related to a URL, the icon is an icon of a browser; and if the second information is related to a password, the icon is an icon of an APP that opens the password.

In an embodiment, presenting the second information includes presenting the second information in a search box of the desktop. Determining whether the second information meets the display condition is performed when the terminal is in the state of desktop, so the second information is presented on the desktop as well, and a search box on the desktop is used to present the second information, that is, the second information is presented in the search box.

When a tap command in the search box is received, a link to the second information is opened. A summary of the information copied to the clipboard, presented by the second information, is a hypertext link at the same time, which is linked to a specified web page or product page. When the user taps the search box, the link can be opened and switch directly to the specified page or product page without the necessity of searching for or opening the corresponding APP, which simplifies the user's operation.

In the presentation of the second information, if it is detected that the state of the terminal is that the terminal quits the desktop, and the number of times that the terminal quits the desktop is more than N, for example, N=3 in the embodiment, the presentation of the second information will be canceled. That is, the second information is presented in the search box of the desktop for 3 times, but if there is no further operation by the user, which indicates that the user has no intention to continue viewing the second information, the presentation of the second information is canceled. Alternatively or additionally, when a time period for presenting the second information exceeds a preset threshold, the presentation of the second information is canceled. For example, a presentation duration of time is set to be 5 seconds, and if the user has no further operation within 5 seconds, the presentation of the second information is canceled.

The following is examples of the above-described method.

Example 1

Figure 2:
FIG. 2 is a schematic diagram of an interface of a terminal according to an exemplary embodiment.

Supposing: User A's child is a preschooler who is going to attend a primary school right away. For a better understanding of relevant policies, User A and some other parents create a WeChat group to exchange relevant policies and information they have learned. One of the parents is going to send her own child to a primary school that she is interested in, User A is interested in this school as well, so User A asks the parent to share information about the school with User A, the parent then sends a URL of a student enrollment website of the school to the WeChat group. After selecting and copying the URL information in WeChat, User A taps a home button to return to the desktop, then "Open the copied URL" is immediately displayed in the search box on the desktop of User A's smart phone. As illustrated in FIG. 2, the smart phone will automatically open a page to which the URL is linked after the search box is tapped, so User A can directly view the information.

Example 2

Figure 3:
FIG. 3 is a schematic diagram of an interface of a terminal according to an exemplary embodiment.

Supposing: User B is a lady who pays more attention to her appearance, she is often shopping for various styles of clothes online, and her aesthetic vision is unanimously appreciated by her friends, and whenever she buys some new clothes, they will ask where she bought it. Later, User B builds a WeChat group, and when she finds pretty clothes, she will share them with her friends in the group; and when they get together, they will share what they talk about with one another at any moment. User B finds that whenever she shares a Taobao password, one of her friends is always the first one to open the link and write a comment at the earliest time. User B asks her friend out of curiosity if she has any quick way or operation mode, and why did she open the link much faster than others? It turns out that her friend just got a new smart phone, thus, after she copies the Taobao password in the WeChat group, and returns to the desktop and taps "Open the Taobao password" that is just displayed in the search box of the desktop, as illustrated in FIG. 3, the smart phone switches directly to a product page of the Taobao APP. While the rest of her friends, after copying the Taobao password in the WeChat group and returning to the desktop, they have to search for the Taobao APP's icon, and tap the icon to access the Taobao APP, and then access the product page corresponding to the Taobao password. Some of them have a lot of APP icons on desktops, and the desktops are displayed in a few pages, so they often have to perform several times of page turning on the desk to find the Taobao APP icon, therefore they often need more operations to open the product page.

In the embodiment of the present disclosure, the system can monitor the content in the clipboard, and display a summary of the content in the clipboard in the search box in time after the user performs an operation of returning to the desktop. If the user has needs for further operation, the user can directly tap a search box area without having to search for and open the corresponding APP. When the user has a lot of APPs installed in the user's smart phone, the method can greatly improve efficiency and experience of the user with minimized interference with the user.

Figure 4:
FIG. 4 is a block diagram illustrating a device of presenting information on a terminal according to an exemplary embodiment.

FIG. 4 is a block diagram illustrating a device for presenting information on a terminal according to an exemplary embodiment. Referring to FIG. 4, the device may be used in a terminal and may include an information acquisition module 41 and an information presentation module 42.

The information acquisition module 41 is configured to acquire first information in a clipboard when an operation interface of the terminal switches to a specified interface.

The information presentation module 42 is configured to generate and present second information based on content of the first information when the first information has not been presented before and meets a presentation condition.

Figure 5:
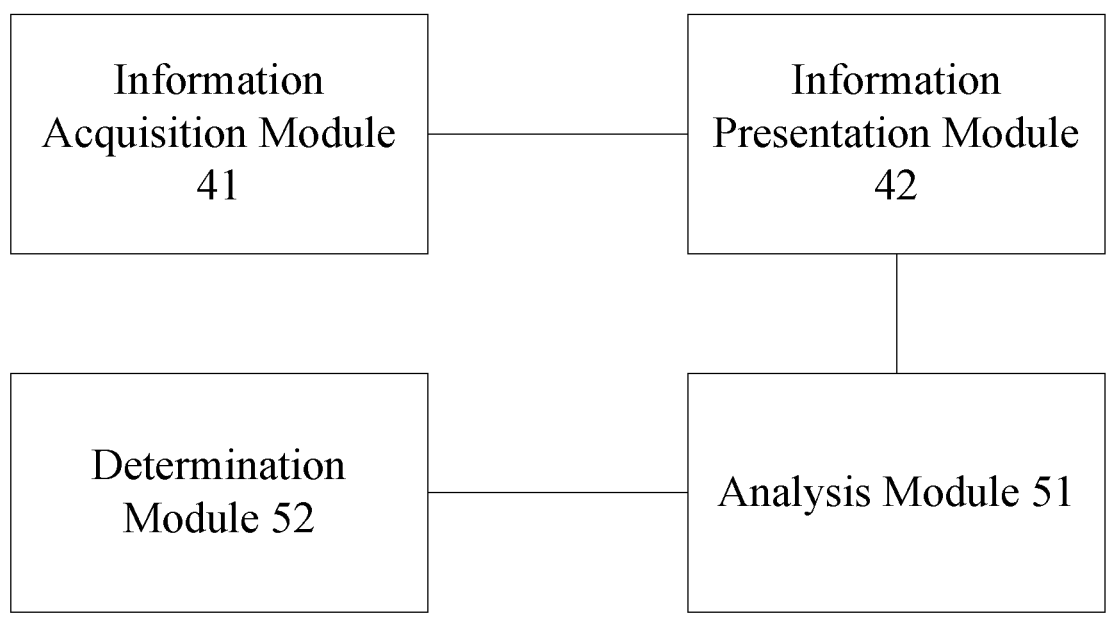
FIG. 5 is a block diagram illustrating a device of presenting information on a terminal according to an exemplary embodiment.

FIG. 5 is a block diagram illustrating a device for presenting information on a terminal according to an exemplary embodiment. Referring to FIG. 5, the device further includes an analysis module 51 and a determination module 52.

The analysis module 51 is configured to locally analyze whether the first information contains a link object, or send the first information to a server and request the server to analyze whether the first information contains a link object.

The determination module 52 is configured to determine that the first information meets the presentation condition if the first information contains the link object.

In an embodiment, the link object includes a uniform resource identifier or associated content.

The information presentation module 42 generates and presents, according to an application that opens the link object, second information related to the application.

The second information is displayed as text information and/or an icon, wherein the icon is an icon of an application.

Presenting the second information by the information presentation module 42 includes: presenting the second information in a search box of a desktop.

Figure 6:
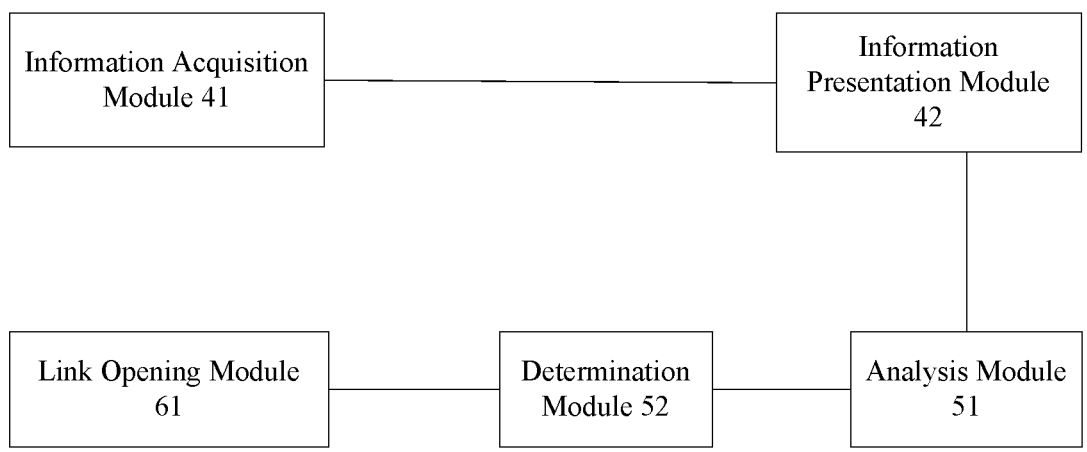
FIG. 6 is a block diagram illustrating a device of presenting information on a terminal according to an exemplary embodiment.

FIG. 6 is a block diagram illustrating a device for presenting information on a terminal according to an exemplary embodiment. Referring to FIG. 6, the device further includes a link opening module 61.

The link opening module 61 is configured to receive a tap command in the search box to open a link object of the second information.

The information presentation module 42 is further configured to cancel the presentation of the second information when the state of the terminal is that the terminal quits the desktop and the number of times that the terminal quits the desktop is more than N, or cancel the presentation of the second information when a time period for presenting the second information exceeds a preset threshold, wherein N is a positive integer, and N 1.

With respect to the devices in the above embodiments, the specific manners for performing operations for individual modules therein have been described in detail in the embodiments regarding the methods, which will not be repeated herein.

Figure 7:
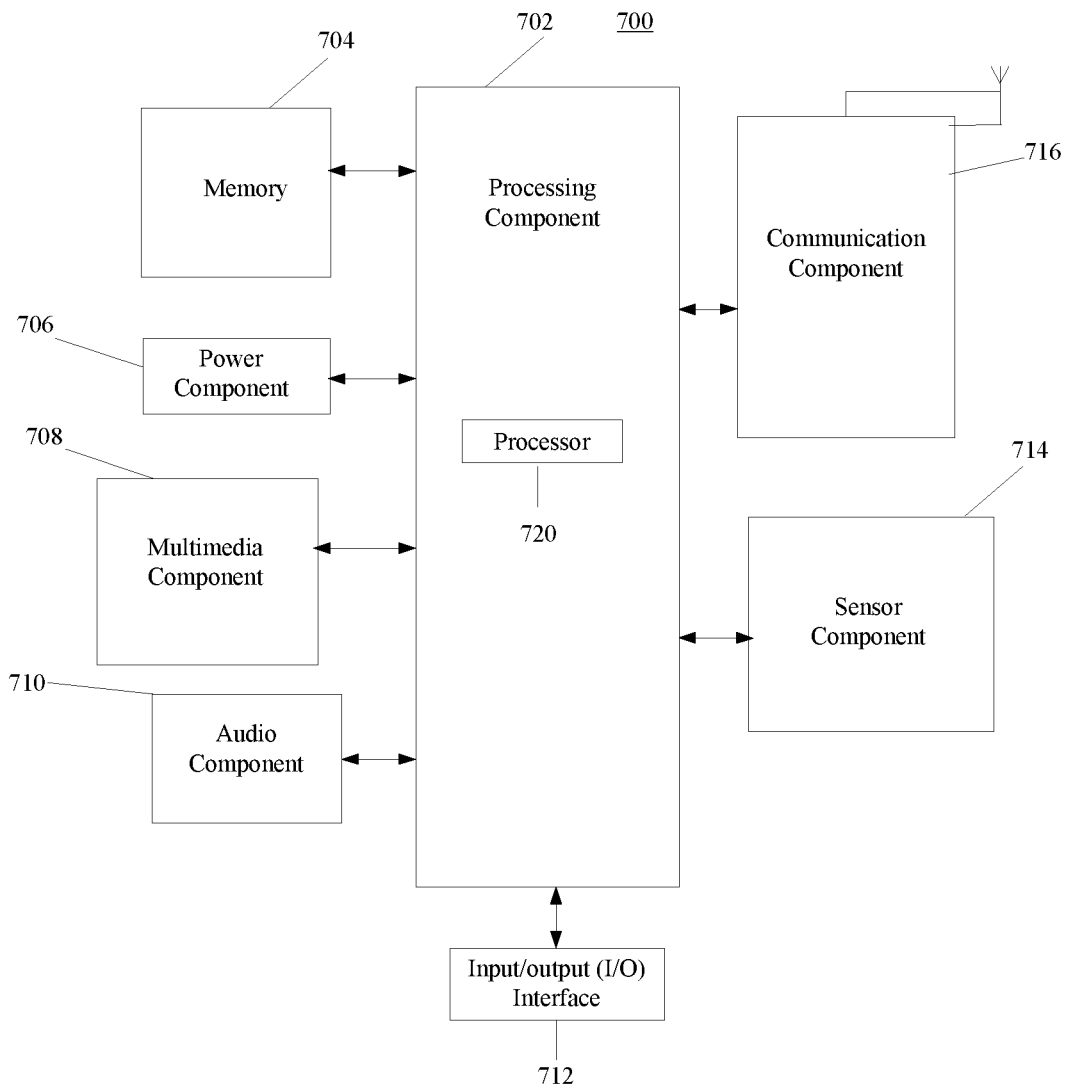
FIG. 7 is a block diagram illustrating a terminal according to an exemplary embodiment.

FIG. 7 is a block diagram illustrating a terminal according to an exemplary embodiment. For example, a device 700 may be a smart phone, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may further include a light sensor, such as a CMOS or CCD image sensor, for use in imaging applications. In some embodiments, the sensor component 714 may further include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 4G, or 5G, or a combination thereof. In one exemplary embodiment, the communication component 716 receives a broadcast signal or broadcast associated information from an external broadcast management system via a broadcast channel In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is further provided a non-transitory computer readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of a mobile terminal, cause the mobile terminal to perform a method of presenting information, the method including: acquiring first information in a clipboard when an operation interface of the mobile terminal switches to a specified interface; and generating and presenting second information based on content of the first information when the first information has not been presented before and meets a presentation condition.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure should only be limited by the appended claims.

What is claimed is:

1. A method of presenting information on a terminal, comprising:
    acquiring first information in a clipboard when an operation interface of the terminal switches to a desktop of the terminal; and
    generating and presenting second information based on content of the first information when the first information has not been presented before and meets a presentation condition,
    wherein the method further comprises:
    cancelling the presenting of the second information on the desktop when a state of the terminal is that the terminal quits the desktop by switching to a different operation interface, and a number of times that the terminal quits the desktop is more than N, N being a positive integer, wherein the second information is not presented when the terminal switches to the desktop after the presenting of the second information is canceled.

2. The method according to claim 1, wherein before generating and presenting the second information based on the content of the first information, the method further comprises:
performing one of:
locally analyzing whether the first information contains a link object; or
sending the first information to a server, and requesting the server to analyze whether the first information contains a link object; and
determining that the first information meets the presentation condition if the first information contains the link object.

3. The method according to claim 2, wherein the link object comprises a uniform resource identifier or associated content.

4. The method according to claim 1, wherein generating and presenting the second information based on the content of the first information comprises:
generating and presenting, according to an application that opens the link object, the second information related to the application.

5. The method according to claim 4, wherein the second information is displayed as at least one of text information or an icon, wherein the icon is an icon of the application.

6. The method according to claim 1, wherein presenting the second information comprises presenting the second information in a search box of the desktop of the terminal.

7. The method according to claim 6, further comprising:
receiving a tap command in the search box to open a link object of the second information.

8. The method according to claim 6, further comprising:
cancelling the presenting of the second information when a time period for presenting the second information exceeds a preset threshold.

9. A terminal, comprising:
a processor; and
a memory for storing instructions executable by the terminal;
wherein the processor is configured to:
acquire first information in a clipboard when an operation interface of the terminal switches to a desktop of the terminal; and
generate and present second information based on content of the first information when the first information has not been presented before and meets a presentation condition,
wherein the processor is further configured to:
cancel the presenting of the second information on the desktop when a state of the terminal is that the terminal quits the desktop by switching to a different operation interface, and a number of times that the terminal quits the desktop is more than N, N being a positive integer, wherein the second information is not presented when the terminal switches to the desktop after the presenting of the second information is canceled.

10. The terminal according to claim 9, wherein the processor is further configured to:
perform one of locally analyzing whether the first information contains a link object, or sending the first information to a server and request the server to analyze whether the first information contains a link object; and
determine that the first information meets the presentation condition if the first information contains the link object.

11. The terminal according to claim 10, wherein the link object comprises a uniform resource identifier or associated content.

12. The terminal according to claim 9, wherein the processor is further configured to generate and present, according to an application that opens the link object, second information related to the application.

13. The terminal according to claim 12, wherein the second information is displayed as at least one text information or an icon, wherein the icon is an icon of the application.

14. The terminal according to claim 9, wherein the processor is further configured to present the second information in a search box of the desktop of the terminal.

15. The terminal according to claim 14, wherein the processor is further configured to receive a tap command in the search box to open a link object of the second information.

16. The terminal according to claim 14, wherein the processor is further configured to:
cancel the presenting of the second information when a time period for presenting the second information exceeds a preset threshold.

17. A non-transitory computer-readable storage medium having stored therein instructions that, when executed by a processor of a terminal, cause the terminal to perform a method of presenting information, and the method comprising:
acquiring first information in a clipboard when an operation interface of the terminal switches to a desktop of the terminal; and
generating and presenting second information based on content of the first information when the first information has not been presented before and meets a presentation condition,
wherein the method further comprises:
cancelling the presenting of the second information on the desktop when a state of the terminal is that the terminal quits the desktop by switching to a different operation interface, and a number of times that the terminal quits the desktop is more than N, N being a positive integer, wherein the second information is not presented when the terminal switches to the desktop after the presenting of the second information is canceled.

* * * * *